April 12, 1927.
P. E. GILLING
1,624,333
ELECTRICAL CONDENSER
Filed March 13, 1925
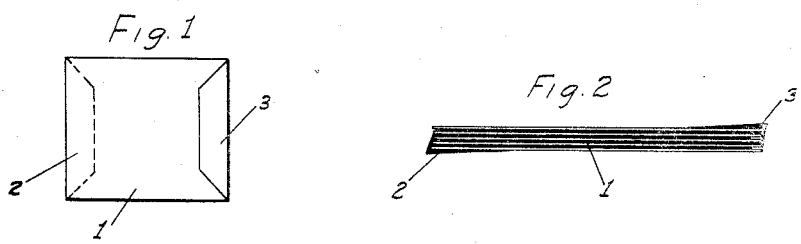
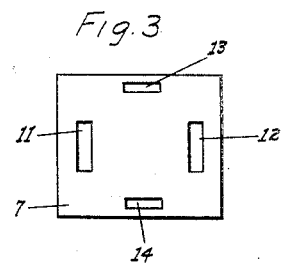
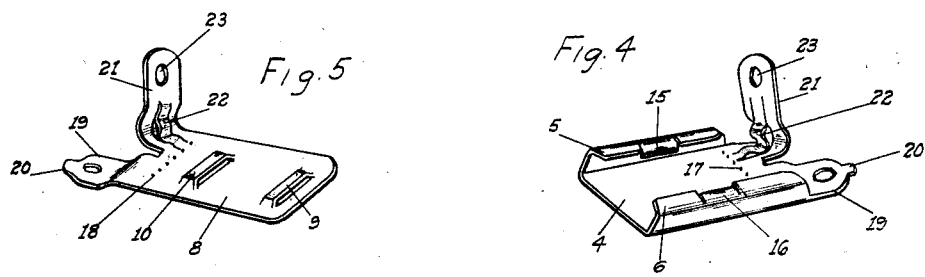
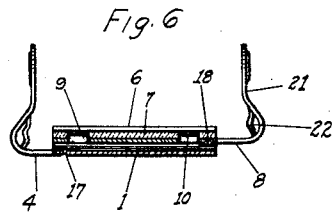
INVENTOR
PRESTON E. GILLING
BY
*A. D. J. Libby*
ATTORNEY Patented Apr. 12, 1927.

1,624,333

UNITED STATES PATENT OFFICE.

PRESTON E. GILLING, OF EAST ORANGE, NEW JERSEY.

ELECTRICAL CONDENSER.

Application filed March 13, 1925. Serial No. 15,230.

This invention relates to an electrical condenser in which a stack of alternate layers of mica and metal foil are built up in any satisfactory manner such as described in Van Deventer Patent 1,181,623 issued May 2, 1916, or in the application of Harry A. Hatch, Serial No. 424,328 filed October 16, 1920, now Patent 1,574,424, issued February 23, 1926.

In the patent and application just referred to, special clamps are used for holding the stack together, said clamps also acting as terminals to which electrical conductors may be connected.

My present invention is directed to an improved form of clamping means for the stack, at the same time one of the objects is to provide a generally improved type of condenser.

Another object of my invention is to provide a condenser which is provided with means for storing a quantity of impregnating material, which is used in the building up of the stack so as to provide for losses of the impregnating material due to temperature or age conditions.

These and other objects will be clear from a study of the specification taken in connection with the drawing wherein—

Figure 1 is a plan view of the condenser stack.

Figure 2 is an enlarged side view of the stack shown in Fig. 1.

Figure 3 is a plan view of the binding member used to hold the stack securely in position.

Figure 4 is a perspective view of one of the electrode plates on which the stack is mounted.

Figure 5 is a perspective view of the other electrode plate, while

Figure 6 is a longitudinal sectional view through the complete assembled condenser.

Referring now to the drawings wherein like numbers refer to corresponding parts in the various views, the stack 1 is made up of alternate layers of a suitable di-electric, such as mica, and metal foil. Alternate metal foils have their ends brought out beyond the end of the stack and are bent downward over the end and bottom of the stack as indicated at 2, while at the other end of the stack the alternate metal foils are brought out and bent over the end of the stack as indicated at 3. After the stack 1 has been formed, it is slid in place onto the electrode plate 4 which has its edges 5 and 6 bent upwardly and inwardly thereby forming flanges for gripping the stack. A binding member 7 of suitable insulating material is first assembled to the electrode plate 8, which has a plurality of projections 9 and 10 formed outwardly from the surface of the plate 8. The projections 9 and 10 are adapted to fit snugly in the slots 11 and 12 of the insulating member 7. The member 7 has additional slots 13 and 14 which are engaged by the fingers 15 and 16, after the electrode plate 8, with the member 7 mounted thereon is slid between the flanges 5 and 6 over the top of the stack, it being understood that the electrode plate 8 is next to the stack. The member 7 is wider than the plate 8 and thereby, through the medium of the projections 9 and 10 and slots 11 and 12, which positions the plate 8 with respect to the binding member 7, prevents the member 8 from contacting with the flanges 5 and 6 of the electrode plate 4. After the plate 8 and binding member 7 are pushed into position, the fingers 15 and 16 are bent downwardly into the depressions or openings 13 and 14, while, at the same time the flanges 5 and 6 are pressed down onto the top of the binding member 7 so that the whole condenser is securely fastened together through the medium of the outer plate 4, and the binding member 7. I prefer to form slight projections or indentations 17 in the plate 4 and similar projections in plate 8 for gripping the bent over foil ends 2 and 3 of the stack 1, thereby insuring good gripping contacts with these foil ends. It will be noted that both the plates 4 and 8 act as additional foil members of the stack as well as performing the other functions which have been assigned to them. In addition, the walls of the projections 9 and 10 of plate 8 form a cavity on the side of the plate 8 toward the stack and at the time of impregnating the condenser before pressing the flanges 5 and 6, as well as the fingers 15 and 16 in the manner as described, a certain amount of impregnating material is retained in these cavities so that, as the condenser increases in age, this trapped impregnating material will slowly creep partly over the edges of the condenser tending to seal them and thereby prevent moisture from entering and thus injuring the condenser. ™₁.. of the plates 4 and 8 are provid⌐ . with lugs 19 by which the condenser can be mounted; the lugs 19 have ears 20 to which wires may be soldered, or I prefer to provide each of the plates 4 and 8 with terminals 21 having quick attachable and detachable means 22, all as described in my application, Serial No. 10,214 filed February 19, 1925. By using this form of terminal, when the condenser is used in a radio set, the connecting wires or bus-bars may be quickly attached to the condenser without the use of any soldering iron. The terminals 21 are also preferably provided with recesses 23 which may be utilized for the purpose of mounting a resistance unit, commonly referred to as a grid leak.

My invention, is, of course, susceptible to certain changes, and I therefore do not wish to be limited except by the scope of the appended claims.

Having thus described my invention what I claim is:

1. An electrical condenser including a stack of alternate strips of metal foil and di-electrics, alternate foil strips having their ends joined together and bent over at the ends of the stack in opposite directions, a metal electrode plate having side flanges for receiving said stack therebetween, a second metal electrode plate adapted to pass over the stack between said flanges and to contact with one set of said bent over ends, a binding member of insulating material over said second electrode plate and means cooperating between said second plate and binding member to keep said second electrode plate out of contact with said flanges, said flanges acting to grip the binding member to hold the said parts securely together.

2. An electrical condenser including a stack of alternate strips of metal foil and di-electrics, alternate foil strips having their ends joined together and bent over at the ends of the stack in opposite directions, a metal electrode plate having side flanges for receiving said stack therebetween, a second metal electrode plate adapted to pass over the stack between said flanges and to contact with one set of said bent over ends, said second plate having a plurality of projections from the side opposite said stack, a binding member of insulating material over said second plate and being wider than said plate and having slots therein to receive said projections whereby said second plate is held out of contact with the first plate, said flanges co-acting with the binding member to hold the parts of the condenser securely together.

3. An electrical condenser comprising a stack of the character described, having the protruding ends of one group of foils bent over the end of the stack in one direction and the ends of the other group bent over the other end of the stack in an opposite direction, an outer conducting plate for receiving the stack and contacting with one set of said foil ends, a second conducting plate on the other side of the stack and contacting with the set of foil ends on said side, a binding member of insulating material exterior to said second plate, means on the outer plate for gripping the binding member and means on said plates for mounting the condenser and making connection therewith.

4. An electrical condenser comprising a stack of the character described, having the protruding ends of one group of foils bent over the end of the stack in one direction and the ends of the other group bent over the other end of the stack in an opposite direction, an outer conducting plate having upwardly turned edges forming gripping flanges for receiving said stack and contacting with one set of said foil ends, a second conducting plate fitting over the other side of the stack between said flanges and contacting with the set of foil ends on this side, a binding member of insulating material fitting over said second plate and gripping by said flanges, associated means acting between the binding member and said second plate to hold the latter securely in position and out of contact with the outer plate flanges and means on said plates for making connections thereto.

5. An electrical condenser comprising a plurality of conducting plates separated by di-electric plates, a binding member and means integral with one of said conducting plates for clamping said binding member in position.

6. An electrical condenser comprising a plurality of conducting plates separated by di-electric plates, a single outer conducting plate, a binding member of insulating material and means integral with said outer conducting plate for clamping said binding member in position.

7. An electrical condenser comprising a plurality of conducting plates separated by di-electric plates, a single outer conducting plate having a mounting terminal and a second terminal arranged to slidably receive a connecting wire and one end of a resistance unit, a second conducting plate having a binding member of insulating material assembled thereon and also having a pair of terminals corresponding to those on said outer plate and means on the outer plate for gripping said binding member as described.

8. An electrical condenser comprising a plurality of conducting plates separated by di-electric plates, a single outer conducting plate having a plurality of circuit terminals, a second conducting plate having a binding member of insulating material assembled thereon and also having terminals corresponding to those on said outer plate and means on said outer plate for gripping said binding member as and for the purpose described.

9. An electrical condenser comprising a stack of the character described, having the protruding ends of one group of foils bent over the end of the stack in one direction and the ends of the other group bent over the other end of the stack in an opposite direction, an outer conducting plate for supporting the stack, a binding member of insulating material cooperating with said conducting plate to grip and hold the stack in place on said conducting plate, a second conducting plate between the binding member and the stack, and held in position by the binding member, and circuit terminals on said conducting plates.

10. An electrical condenser comprising a stack of the character described, having the protruding ends of one group of foils bent over the end of the stack in one direction and the ends of the other group bent over the other end of the stack in an opposite direction, an outer conducting plate for supporting the stack, a binding member of insulating material cooperating with said conducting plate to grip and hold the stack in place on said conducting plate, a second conducting plate between the binding member and the stack, said second plate having portions formed outwardly to make depressions on the inner side and projections on the outer side, said binding member having openings therein to receive said projections as and for the purposes described, and circuit terminals on said conducting plates.

11. An electrical condenser comprising a stack of the character described, having the protruding ends of one group of foils bent over the end of the stack in one direction and the ends of the other group bent over the other end of the stack in an opposite direction, an outer conducting plate for supporting the stack, a binding member of insulating material cooperating with said conducting plate to grip and hold the stack in place on said conducting plate, a second conducting plate between the binding member and the stack, said second plate having portions forming pockets for impregnating material, the wall of said pockets co-acting with the binding member to hold said plate in position and circuit terminals on said conducting plates.

12. An electrical condenser comprising a stack of the character described, having the protruding ends of one group of foils bent over the end of the stack in one direction and the ends of the other group bent over the other end of the stack in an opposite direction, an outer conducting plate for supporting the stack, a binding member of insulating material cooperating with said conducting plate to grip and hold the stack in place on said conducting plate, a second conducting plate between the binding member and the stack, and held in position by the binding member, said plates being provided with a series of indentations for gripping the overturned foil ends and circuit terminals on said conducting plates.

13. A condenser having an outer electrode plate, a binding member engaged by portions of said electrode plate and a second electrode plate positioned by the binding member within said outer plate engaging portions.

14. A condenser having an outer electrode plate, a binding member engaged by portions of said electrode plate, a second electrode plate attached to said binding member and held in position thereby, said second plate having at least one cavity on its inner side for retaining a sealing material for the condenser.

In testimony whereof, I affix my signature.

PRESTON E. GILLING.